(12) United States Patent
Ganesan et al.

(10) Patent No.: US 8,850,381 B1
(45) Date of Patent: Sep. 30, 2014

(54) AUTOMATIC CLOCK TO ENABLE CONVERSION FOR FPGA BASED PROTOTYPING SYSTEMS

(71) Applicant: Cadence Design Systems, Inc., San Jose, CA (US)

(72) Inventors: Subramanian Ganesan, Saratoga, CA (US); Philip Henry Nils Anthony De Buren, San Francisco, CA (US); Jinny Singh, Santa Clara, CA (US); David Abada, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/834,158

(22) Filed: Mar. 15, 2013

Related U.S. Application Data

(60) Provisional application No. 61/752,391, filed on Jan. 14, 2013.

(51) Int. Cl.
*G06F 17/50* (2006.01)

(52) U.S. Cl.
CPC .................................. *G06F 17/5045* (2013.01)
USPC ........... 716/136; 716/116; 716/117; 716/134; 716/137; 716/138; 703/28

(58) Field of Classification Search
USPC ......... 716/100–101, 103–104, 110, 116–117, 716/132, 134, 136–138; 703/13–14, 19, 23
See application file for complete search history.

(56) References Cited

U.S. PATENT DOCUMENTS

| | | | | |
|---|---|---|---|---|
| 8,104,012 B1 * | 1/2012 | Klein et al. | | 716/132 |
| 8,595,683 B1 * | 11/2013 | de Buren et al. | | 716/137 |
| 2008/0094102 A1 * | 4/2008 | Osann | | 326/39 |

* cited by examiner

*Primary Examiner* — Stacy Whitmore
(74) *Attorney, Agent, or Firm* — Dickstein Shapiro LLP

(57) ABSTRACT

The present patent document relates to a method and apparatus for an automatic clock to enable conversion for FPGA-based prototyping systems. A library or netlist is provided having a plurality of state elements of a chip design to be prototyped by a user. The chip design can have dozens of different user clocks and clock islands using these different user clocks. The state elements of an element library or netlist are converted to a circuit having one or more state elements and other logic that receive both a user clock as well as a fast global clock. With the disclosed transformations, the functionality of the original state element is maintained, and a single or low number of global clocks can be distributed in an FPGA of the prototype with user clocks generated locally on the FPGA.

28 Claims, 12 Drawing Sheets

AUTOMATIC CLOCK TO ENABLE CONVERSION FOR FPGA BASED PROTOTYPING SYSTEMS

CROSS-REFERENCE TO RELATED APPLICATION

This application claims the benefit of Provisional Application No. 61/752,391, filed Jan. 14, 2013. Priority to this provisional application is expressly claimed, and the disclosure of the provisional application is hereby incorporated herein by reference in its entirety.

FIELD

The present patent document relates generally to verifying the functionality of integrated circuit designs prior to fabrication. In particular, the present patent document relates to a method and apparatus for an automatic clock to enable conversion for FPGA-based prototyping systems.

BACKGROUND

Designers of integrated circuit devices ("chips"), generally application-specific integrated circuits ("ASIC") or system-on-a-chip ("SOC") type designs, may use prototyping as part of the electronic design automation process prior to manufacture of the chip by a foundry. Prototyping is one type of hardware-based functional verification that allows the circuit designer to observe the behavior of the circuit design under conditions approximating its final, manufactured performance. During prototyping, a circuit design, generally written with a hardware description language ("HDL"), which is often register transfer language ("RTL") code, is programmed into one or more programmable logic chips, frequently field-programmable gate arrays ("FPGA") on a prototyping board. FPGA-based prototypes are a fully functional representation of the circuit design, its circuit board, and its input/output ("I/O") devices. FPGA prototypes generally run at speeds much closer to the clock speed at which the manufactured ASIC or SOC will run than other types of functional verification, thereby making such prototyping systems faster, which allows for more in depth verification. The circuit design prototype may also be inserted into another electronic circuit so that the circuit design prototype may be observed and tested in an environment in which the manufactured chip will be used. As such, circuit designers may use FPGA prototyping as a vehicle for software co-development and validation, increasing the speed and accuracy of system developments.

Exemplary hardware used in prototyping comprises FPGAs or other types of programmable logic chips, input/output circuitry, and interconnect circuitry connecting the programmable logic chips to each other and to the input-output circuitry. An example of commercial prototyping hardware includes the DN7006K10PCIe-8T manufactured by the DINI Group of La Jolla, Calif. The DN7006K10PCIe-8T features six Altera Stratix 3 3SL340 (FF1760) FPGAs, a configuration FPGA, global clock generation hardware, interconnect connecting the FPGAs to each other, input/output devices including an eight lane PCI Express Endpoint, and DDR SODIMM slots for the insertion of RAM.

ASIC and SOC chip designs typically have a large number of different user clocks, as many as several dozen user clocks resulting in hundreds of internal clock nets, because circuit designers find the use of multiple clocks to bestow certain performance advantages in their circuit designs. In order for prototyping to be most effective, the prototype needs to match as closely as possible the functionality of the circuit design as it will be manufactured, which includes the prototype using the same number of clocks as the circuit design. In most FPGA-based prototyping systems, clock signals are generated by a central clock generator that is on the prototyping board, but not part of any FPGA hosting a circuit design partition. These user clock signals are then distributed to each FPGA. Using this method of clock generation, there may be many user clock lines occupying a greater number of FPGA I/O pins than is desirable. However, unlike the manufactured chip, the FPGAs used for prototyping have a limited number of global resources to route clock signals. For example, a typical FPGA may only have sixteen global clock routing resources. When using prototyping to verify such chip designs, mapping the clocks of the design ("user clocks") to the FPGA can cause problems. Notably, if a user clock is routed in the FPGAs using nets other than the global clock nets, for example because all the dedicated global clock routing resources are used by other user clocks, there may be significant delay, which results in hold time violations in the circuit receiving this user clock. Such violations are difficult to fix, and often cannot be solved simply by slowing down the overall operation of the prototyped design due to the very small data delay between logic.

Several other problems arise due to numerous user clocks in addition to simply running out of FPGA global clock resources. Many modern ASIC or SOC chip designs use some form of clock gating to save power, for example chips used in cellular telephones or other portable electronic devices. When certain portions of the chip are not in use, a clock gate may be disabled, preventing a clock from reaching that portion of the chip, reducing switching activity and saving power. However, when mapping the chip design to the FPGAs of the prototyping system, the FPGA software can treat the chip design as having more user clocks due to the clock gates and perceive that there are insufficient global clock resources available in the FPGA. For example, if a single user clock is separately gated to two different clock islands in the chip, the FPGA software may perceive three different nets, and therefore three different clocks: one clock incoming to the clock gate, a second clock for the first island, and a third clock for the second island. If only two global clock resources were available, the FPGA software may route the two clocks, but ignore the third, even though there is really only a single clock.

Another problem is that using a large number of user clocks greatly increases the place and route times for the FPGA. The amount of time needed for the FPGA software to perform timing analysis during place and route of the chip design in the FPGA increases exponentially with the number of user clocks.

Furthermore, if the flip-flops of the FPGA feature an enable pin, as is common in modern FPGA prototyping boards, complex gating logic may not always be converted automatically to work in this clock plus enable configuration. In additional, some clock distribution networks use multiplexers receiving multiple user clocks, for example so that a particular circuit can selectively receive a first clock at one time or a different user clock at another time. It may not possible to convert these multiplexers to a clock plus enable configuration in the FPGA circuit.

SUMMARY

A method and apparatus for an automatic clock to enable conversion for FPGA-based prototyping systems is disclosed.

An embodiment comprises a computer-implemented method of transforming a plurality of state elements of a circuit design, the method comprising receiving a circuit design having a plurality of user state elements configured to operate using a plurality of user clocks, each user clock having a user clock frequency; selecting a set of user state elements from the plurality of user state elements, one or more of the user state elements of the set of user state elements having a highest user clock frequency; selecting a global clock frequency at least twice the highest user clock frequency; and transforming each user state element of the set of user state elements into a transformed user state element circuit comprising one or more state elements, each state element configured to receive a global clock having the global clock frequency, each transformed user state element configured to receive the same inputs as its corresponding user state element, and each transformed user state element performing the function of the user state element at the user clock frequency.

In another embodiment the method further comprises selecting a second set of user state elements from the plurality of user state elements, one or more of the user state elements of the set of user state elements having a second highest user clock frequency; selecting a second global clock frequency at least twice the second highest user clock frequency; and transforming each user state element of the second set of user state elements into a transformed user state element circuit comprising one or more state elements, each state element configured to receive a second global clock having the second global clock frequency, each transformed user state element configured to receive the same inputs as its corresponding user state element; and each transformed user state element performing the function of the user state element at the user clock frequency.

According to another embodiment each user state element comprises one of an edge-sensitive state element having an enable port, an edge-sensitive state element lacking an enable port, and a level-sensitive state element.

Another embodiment comprises a computer-implemented method of transforming a circuit design netlist for FPGA configuration, the method comprising receiving a netlist for a circuit design, wherein the circuit design comprises a plurality of instances of state elements, each state element configured to receive a user clock having a user clock frequency; determining a highest user clock frequency; inputting the netlist into an FPGA configuration program; parsing the netlist to find a plurality of state elements; analyzing each state element of the plurality of state elements to determine a plurality of convertible state elements comprising a subset of the plurality of state elements, wherein each convertible state element has a plurality of ports configured to receive a plurality of inputs including a user clock; providing a plurality of circuit instances, each circuit instance representing functionality equivalent to at least one of the convertible state elements, wherein each circuit instance is configured to receive a fast global clock having a frequency at least twice the highest user clock frequency, and each circuit instance having a plurality of ports corresponding to the ports of the convertible state element; and changing a port mapping for the ports of each convertible state element to align with the ports of a circuit instance equivalent to the convertible state element.

According to another embodiment wherein circuit instance of the plurality of circuit instances comprises one of an edge-sensitive state element having an enable port, an edge-sensitive state element lacking an enable port, and a level-sensitive state element.

According to another embodiment a circuit instance of the plurality of circuit instances comprises an inverter configured to receive the user clock; a first FPGA primitive having an input port and an output port, configured to receive an inverted user clock from the inverter at an enable port, and configured to be clocked by the fast global clock; a second FPGA primitive having an input port electrically connected to the output port of the first FPGA primitive, having an output port electrically connected to the input port of the first FPGA primitive, configured to receive the user clock, and configured to be clocked by the fast global clock.

According to another embodiment a circuit instance of the plurality of circuit instances comprises two FPGA primitives, each FPGA primitive receiving the fast global clock.

Another embodiment comprises a computer-readable non-transitory storage medium having stored thereon a plurality of instructions. The plurality of instructions when executed by a computer, cause the computer to perform receiving a circuit design having a plurality of user state elements configured to operate using a plurality of user clocks, each user clock having a user clock frequency; selecting a set of user state elements from the plurality of user state elements, one or more of the user state elements of the set of user state elements having a highest user clock frequency; selecting a global clock frequency at least twice the highest user clock frequency; and transforming each user state element of the set of user state elements into a transformed user state element circuit comprising one or more state elements, each state element configured to receive a global clock having the global clock frequency, each transformed user state element configured to receive the same inputs as its corresponding user state element, and each transformed user state element performing the function of the user state element at the user clock frequency.

According to another embodiment the plurality of instructions when executed by a computer cause the computer to further perform selecting a second set of user state elements from the plurality of user state elements, one or more of the user state elements of the set of user state elements having a second highest user clock frequency; selecting a second global clock frequency at least twice the second highest user clock frequency; and transforming each user state element of the second set of user state elements into a transformed user state element circuit comprising one or more state elements, each state element configured to receive a second global clock having the second global clock frequency, each transformed user state element configured to receive the same inputs as its corresponding user state element; and each transformed user state element performing the function of the user state element at the user clock frequency.

According to another embodiment each user state element comprises one of an edge-sensitive state element having an enable port, an edge-sensitive state element lacking an enable port, and a level-sensitive state element.

Another embodiment comprises a computer-readable non-transitory storage medium having stored thereon a plurality of instructions. The plurality of instructions when executed by a computer, cause the computer to perform receiving a netlist for a circuit design, wherein the circuit design comprises a plurality of instances of state elements, each state element configured to receive a user clock having a user clock frequency; determining a highest user clock frequency; inputting the netlist into an FPGA configuration program; parsing the netlist to find a plurality of state elements; analyzing each state element of the plurality of state elements to determine a plurality of convertible state elements comprising a subset of the plurality of state elements, wherein each convertible state element has a plurality of ports configured to receive a plurality of inputs including a user clock; providing a plurality of circuit instances, each circuit instance representing functionality equivalent to at least one of the convertible state elements, wherein each circuit instance is configured to receive a fast global clock having a frequency at least twice the highest user clock frequency, and each circuit instance having a plurality of ports corresponding to the ports of the convertible state element; and changing a port mapping for the ports of each convertible state element to align with the ports of a circuit instance equivalent to the convertible state element.

According to another embodiment each circuit instance of the plurality of circuit instances comprises one of an edge-sensitive state element having an enable port, an edge-sensitive state element lacking an enable port, and a level-sensitive state element.

According to another embodiment a circuit instance of the plurality of circuit instances comprises an inverter configured to receive the user clock; a first FPGA primitive having an input port and an output port, configured to receive an inverted user clock from the inverter at an enable port, and configured to be clocked by the fast global clock; a second FPGA primitive having an input port electrically connected to the output port of the first FPGA primitive, having an output port electrically connected to the input port of the first FPGA primitive, configured to receive the user clock, and configured to be clocked by the fast global clock.

According to another embodiment a circuit instance of the plurality of circuit instances comprises two FPGA primitives, each FPGA primitive receiving the fast global clock.

The above and other preferred features described herein, including various novel details of implementation and combination of elements, will now be more particularly described with reference to the accompanying drawings and pointed out in the claims. It will be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

Figure 1:
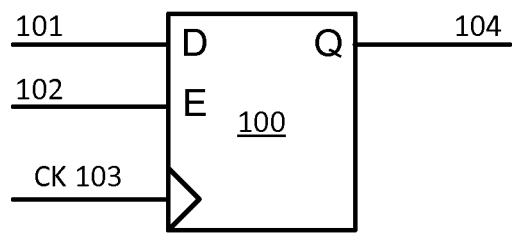
FIG. 1 is an illustration of an edge-sensitive state element having an enable.

The figures are not necessarily drawn to scale and the elements of similar structures or functions are generally represented by like reference numerals for illustrative purposes throughout the figures. The figures are only intended to facilitate the description of the various embodiments described herein; the figures do not describe every aspect of the teachings disclosed herein and do not limit the scope of the claims.

DETAILED DESCRIPTION

A method and apparatus for an automatic clock to enable conversion for FPGA-based prototyping systems is disclosed. Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the various embodiments described herein. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also disclosed is an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

According to an embodiment, each of the state elements in a design library that receive a user clock for a chip design may be converted to state elements having enable pins. This conversion can occur prior to configuring one or more FPGAs of a prototyping system. Each of the edge-triggered state elements may be replaced with a group of one or more edge-triggered state elements, creating a transformed state element. Each transformed state element, which can include a group of one or more state elements, may be configured to receive a single global clock that may be at least twice as fast as the user clock. The original user clocks can be mapped to enable inputs for the converted state elements, while the global clock is used to clock the converted state elements. The new global clock is referred to herein as a clock-to-enable conversion clock ("CTEC_CLK"). The level-triggered state elements can be replaced with an edge-triggered state element clocked by the global clock CTEC_CLK. The latch enable signal becomes an enable signal of the new state element.

Figure 2:
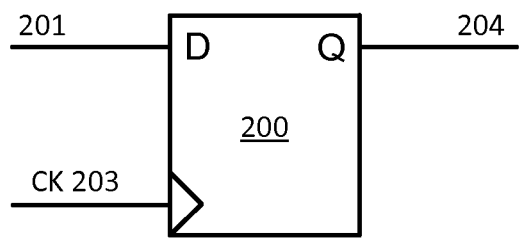
FIG. 2 is an illustration of an edge-sensitive state element.
Figure 3:
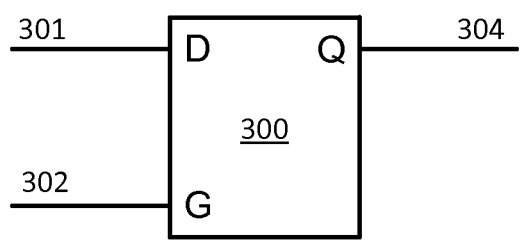
FIG. 3 is an illustration of a level-sensitive state element.

The state elements illustrated in FIGS. 1-3 are commonly used in ASIC or SOC designs, and can be mapped to the FPGAs during prototyping. The many state elements 100 of FIG. 1, 200 of FIGS. 2, and 300 of FIG. 3 found in the chip design may each receive one of many different clocks.

FIG. 1 illustrates an edge-sensitive state element 100 having an enable. If a signal present at an enable (E) input 102 of state element 100 has a high value on the rising edge of clock signal CK 103, the value (low or high) present at the data (D) input 101 is passed to the data (Q) output 104. State element 100 holds the low or high value at output 104 at least until the next clock rising edge. If the signal present at E input 102 has a low value, the output 104 is held at current value, regardless of the change on the D input 101.

FIG. 2 illustrates an edge-sensitive state element 200 lacking an enable. The value (low or high) present at the data (D) input 201 is passed to the data (Q) output 204 on the rising edge of clock CK 203.

FIG. 3 illustrates a level-sensitive state element 300. The D input 301 (low or high) is passed to the Q output 304 as long as a level high signal is present at latch enable (G) input 302. The Q output will hold the low or high value at its current value, regardless of the change on the D input 301, if a low value is present at the latch enable (G) input 302. The G input 302 can receive a clock signal, such that the value low or high at D input 301 is passed to Q output 304 when the clock is high, and the value low or high is held at Q output 304 when the clock is low.

Figure 4:
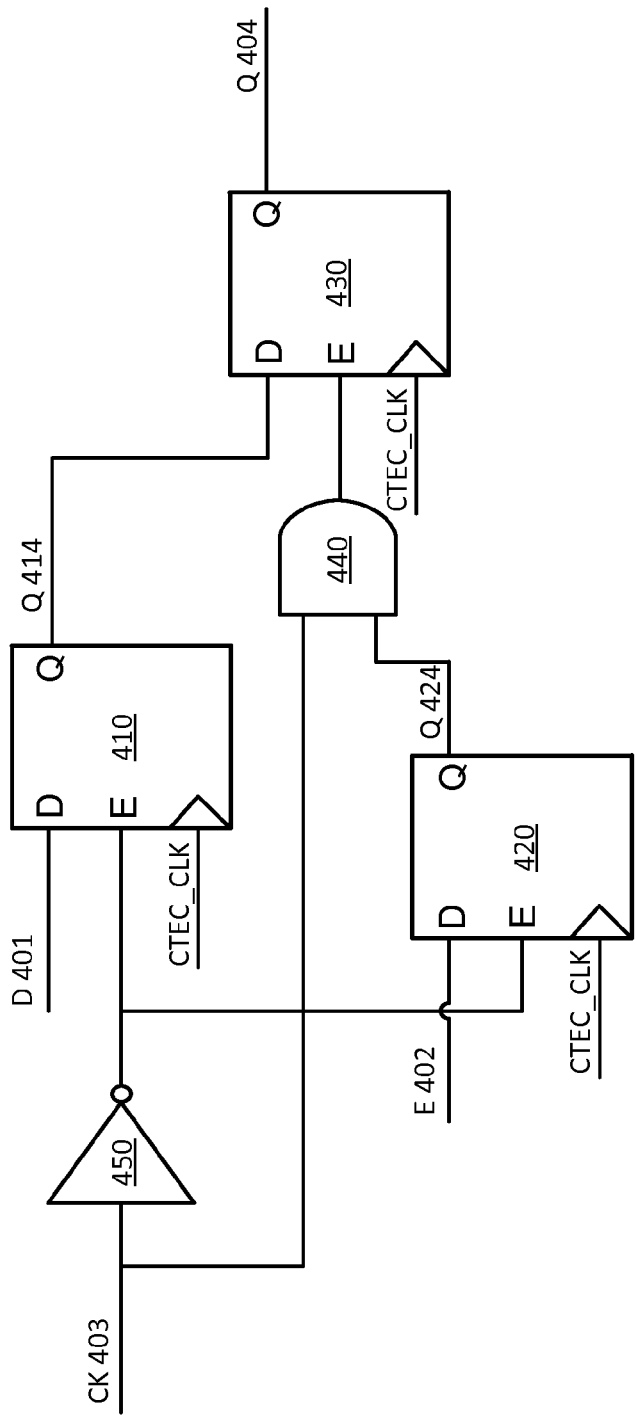
FIG. 4 is an illustration of a transformed edge-sensitive state element having an enable.

FIG. 4 is an illustration of a library transformation of the edge-sensitive state element having an enable illustrated in FIG. 1. According to an embodiment, state element 100 may be replaced by three state elements 410, 420, and 430, each having an enable, as well as an AND gate 440 and inverter 450. Each of the state elements 410, 420, and 430 can be clocked by the fast clock of CTEC_CLK. The data input D of state element 410 may be configured to receive a data input signal D 401. The data input signal 401 is the signal formerly received at the data input D of state element 100. The enable E of state element 410 receives user clock CK 403 after it is inverted by inverter 450. The data output Q of state element 410 is connected to the data input D of state element 430. State element 430 is configured to output the data output Q 404.

The data input D of state element 420 in configured to receive the enable signal E 402. E 402 is the enable signal previously received at the enable pin E of state element 100. The data output Q of state element 420 is connected to AND gate 440 is configured to output signal Q 424 that is received by the AND gate 440. AND gate 440 is also configured to receive user clock 403. The output of AND gate 440 controls the enable E of state element 430. Enable E of state element 420, like state element 410, receives the inverted user clock CK 403 from inverter 450. State elements 410 and 420 are enabled during the low value of the user clock signal 403, and state element 430 transfers the user clock signal 403 is a high value.

According to this embodiment's transformation, the edge sensitive state element 100 increases in size from a single state element to three state element plus two logic gates, each of the state elements may now be clocked by a fast global clock CTEC_CLK rather than the user clock.

Figure 5:
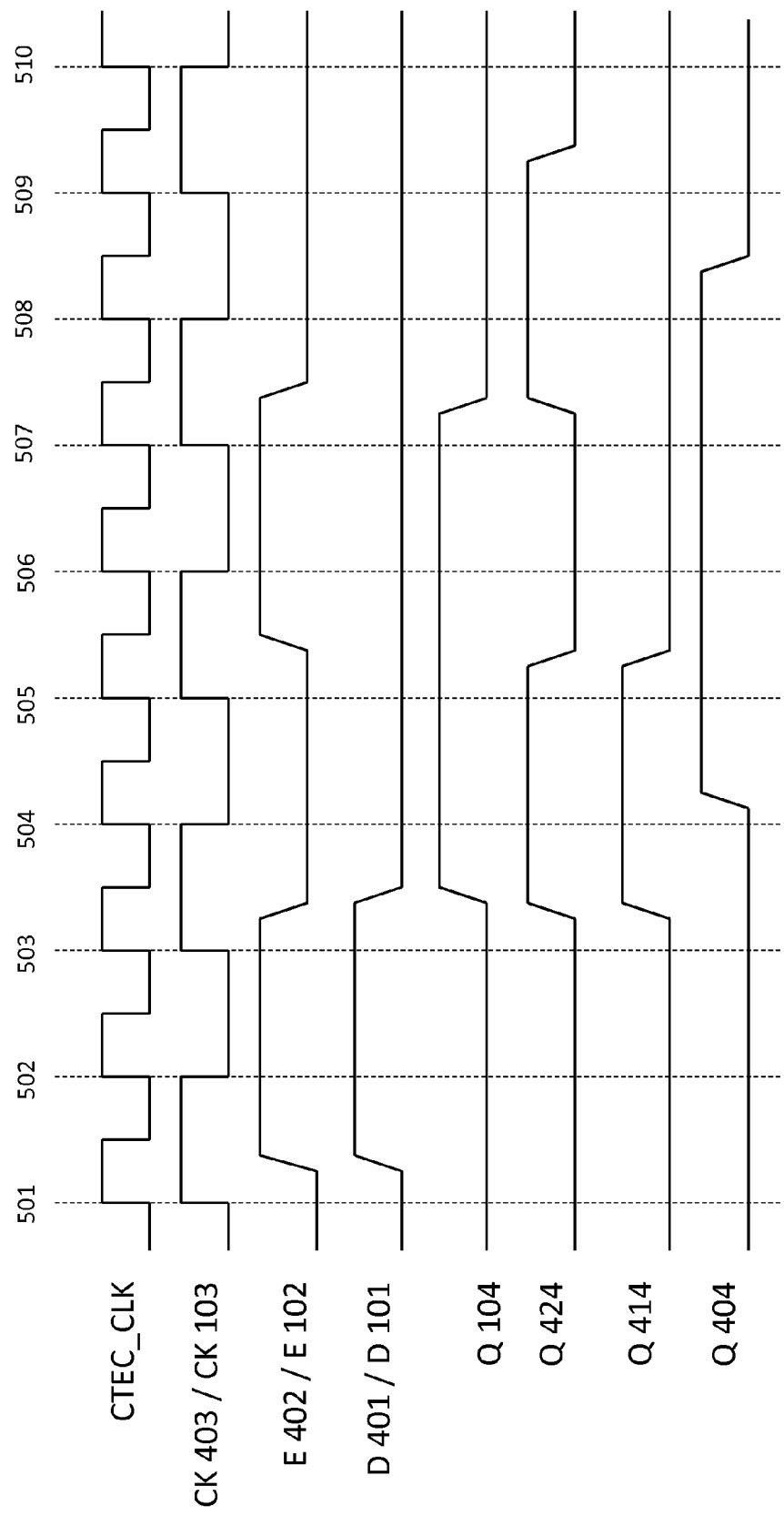
FIG. 5 illustrates a timing diagram for a transformed edge-sensitive state element having an enable and an edge-sensitive state element having an enable.

FIG. 5 is a timing diagram for various nodes of the edge-sensitive state element of FIG. 1 and various nodes of the transformed edge-sensitive state element of FIG. 4 according to an embodiment. Here the global clock CTEC_CLK of the transformed edge-sensitive state element may be at least twice as fast as user clocks CK 403 and CK 103. The inputs (and outputs) are initially all low at time 501. Between time 501 and 502, data input 401 and enable 402 go high. On the rising edge of CTEC_CLK at time 502, the input D 401 is now high, but state element 410 is not yet enabled; user clock CK 403 is high, but is inverted at the enable input of state element 410. By time 503, state element 410 is enabled, and passes input D 401 having a high value to its output Q 414 on the rising edge of CTEC_CLK. Likewise, the high enable is passed to the output of state element 420 as Q 424. In the edge-sensitive state element 100, the output Q 104 would go high after time 503 as well. In the transformed edge-sensitive state element, the output Q 404 does not go high until after the next rising edge of CTEC_CLK at time 504 when state element 430 passes the high value of Q 414 to its output Q 404.

Figure 6:
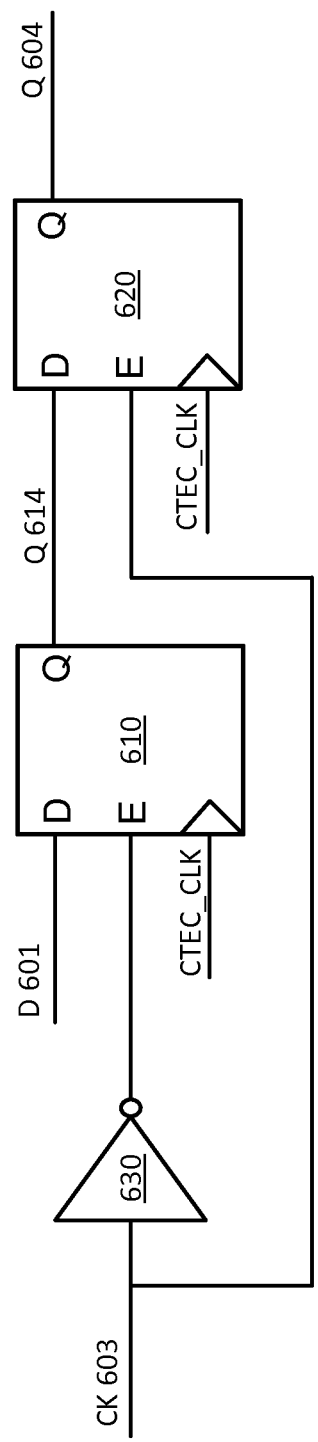
FIG. 6 is an illustration of a transformed edge-sensitive state element.

FIG. 6 is an illustration of a library transformation of the edge-sensitive state element illustrated in FIG. 2, the state element lacking an enable input, according to an embodiment. For this state element conversion, at least two state elements clocked by the global clock CTEC_CLK, plus an inverter may be needed. The data signal 601 is received at data input D of state element 610, which is enabled by an inverted user clock, received from inverter 630. The data output Q of state element 610 is connected by node D 614 to the data input D of a second state element 620. State element 620 is enabled by the user clock CK 603 which is received at the enable input E.

Figure 7:
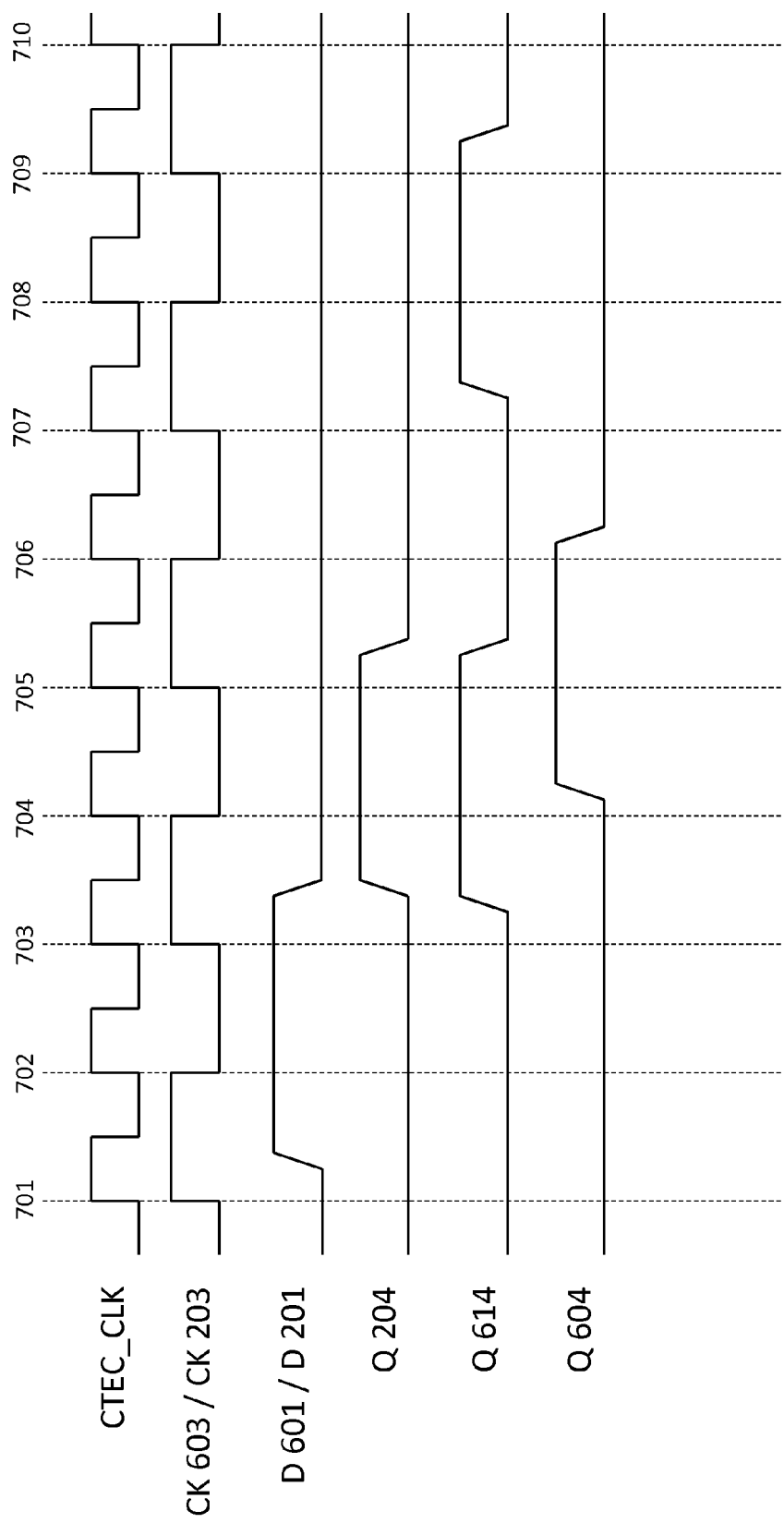
FIG. 7 illustrates a timing diagram for a transformed edge-sensitive state element and an edge-sensitive state element.

FIG. 7 is a timing diagram showing various nodes of the edge-sensitive state element of FIG. 2 and various nodes of the transformed edge-sensitive state element of FIG. 6, according to an embodiment. The global clock CTEC_CLK of the transformed edge-sensitive state element may be at least twice as fast as user clocks CK 603 and CK 203. The inputs and outputs are initially all low at time 701. Between time 701 and 702, data input 601 goes high. On the rising edge of CTEC_CLK at time 702, the input D 601 is now high, but state element 610 is not yet enabled; user clock CK 603 is high, but is inverted at the enable input of state element 610. By time 703, state element 610 is enabled by a low user clock CK 603, and state element 610 passes input D 601 after the rising edge of CTEC_CLK, causing a high value at its output Q 614. The next rising edge on CTEC_CLK at time 704, and when user clock CK 603 is high to enable state element 620 drives output Q of state element 620 to a high value at node Q 604.

By comparison, in the edge-sensitive state element 200, the output Q 204 goes high after the rising edge of CK 203 at time 703. In the transformed edge-sensitive state element, the output Q 604 may not go high until after the next rising edge of CTEC_CLK at time 704. However, in the transformed edge-sensitive state element, the output nonetheless can go high prior to the next rising edge of the user clock CK 603 at time 705.

Figure 8:
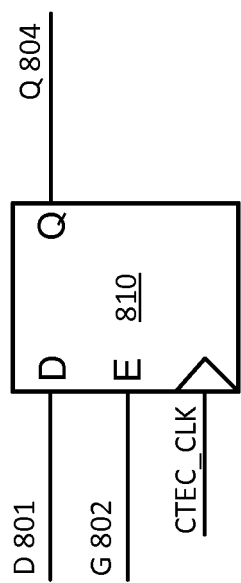
FIG. 8 is an illustration of a transformed level-sensitive state element.

FIG. 8 is an illustration of a library transformation of the level sensitive state element illustrated in FIG. 3 according to an embodiment. The original latch enable signal G 802 may be routed to the enable E input of state element 810. Input D can be configured to receive data input 801, and state element 810 can be clocked with global clock CTEC_CLK. Output Q outputs Q 804.

Figure 9:
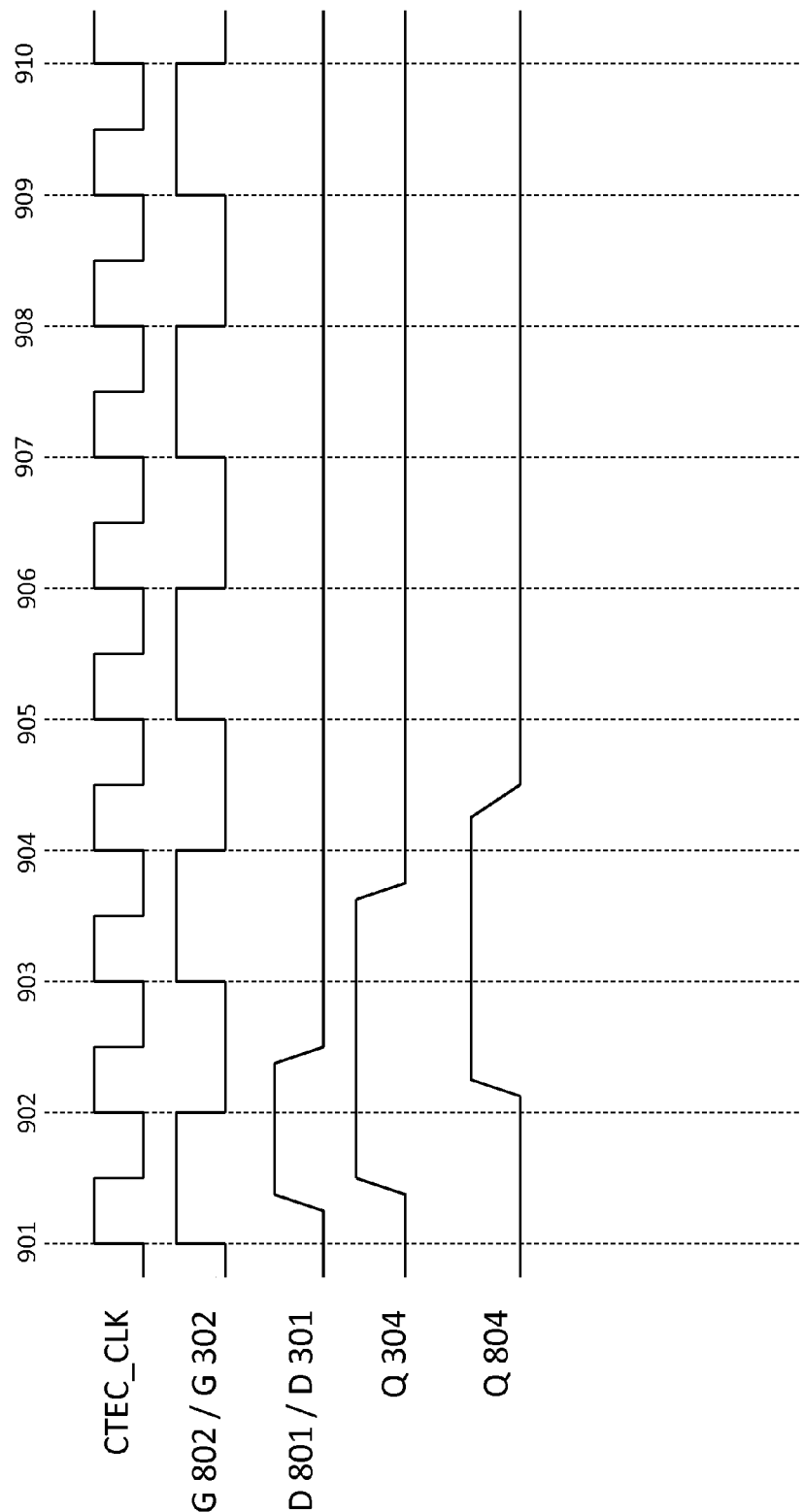
FIG. 9 illustrates a timing diagram for a transformed level-sensitive state element and a level-sensitive state element.

FIG. 9 is a timing diagram showing various nodes of the level-sensitive state element 300 of FIG. 3 and various nodes of the transformed edge-sensitive state element 810 of FIG. 8 according to an embodiment. The global clock CTEC_CLK may be at least twice as fast as latch-enable signal G 802 and G 302. For state element 300, if latch-enable G 302 is high, then when data input signal D 801 goes high at input D of state element 300, the output signal Q 304 is driven high at the output D of the state element 300. In the transformed version of state element 300, state element 810 is an edge-sensitive state element. After time 901, state element 810 is enabled by latch-enable G 802 and data input D 801 transitions from low to high. The rising edge of global clock CTEC_CLK at time 902 triggers the output Q 804 to be driven high. By contrast, the output of level-sensitive state element 300 is driven high prior to the rising edge of the global clock at time 902, but in either the case of the level-sensitive state element 300 or the transformed edge-sensitive state element 810, the output is driven high prior to the next time 903 that the latch-enable signal is driven high.

When the data input D 301 goes low again after time 902, the output Q 304 goes low after the latch-enable again goes high after time 903. For the transformed state element 810, when the data input D 801 goes high, the output Q 804 goes high after time 904, which may be the next rising edge of the global clock CTEC_CLK when the latch-enable signal G 802 is high. Again, in either case, the output Q 804 nonetheless can go low prior to the next time 905 that the latch-enable signal again goes high.

The above described library transformation can be accomplished for a particular chip design that may be provided in a hardware-description language, for example VHSIC Hardware Description Language ("VHDL"). The chip design can be synthesized to generate a cell library, having pre-transformation state elements, including any edge-sensitive with enable, edge-sensitive lacking an enable, and level-sensitive state elements. Before the synthesized chip design is passed to the FPGA compiler software, the state elements can be transformed in the library according to the various embodiment as described herein. After transformation, the FPGA compiler can compile the chip design for the FPGA using the transformed library.

According to the above-described embodiments, a chip design has various clock domains or islands of logic, clocked by a particular clock frequency, that may be enabled or disabled through the use of clock gating structures. The clock gating structures can be a simple gate that passes or blocks a clock from reaching a particular logic island, or a gate in conjunction with circuitry to change the frequency of the clock. The various user clocks of the chip design may be generated locally in the FPGA from the global clock CTEC_CLK, or are derived from another clock that was derived from the global clock CTEC_CLK. A user clock need not be derived directly from global clock CTEC_CLK, but can be derived from a user clock that itself was derived from the global clock CTEC_CLK. The clock generation circuitry can include combinations of AND gates, OR gates, and other logic, as well as enable signals. The clock-generation circuitry can be relatively complex, depending on the particular user clock frequency and the global clock frequency, because certain user clock frequencies will likely be simpler to derive from the global clock. An advantage of this of this approach is that increased user clock delay can be tolerated without increasing hold-time errors. Another advantage is that analysis by the FPGA compiler may be simplified because the same global clock can be used, resulting in faster compile times during FPGA configuration.

Figure 10:
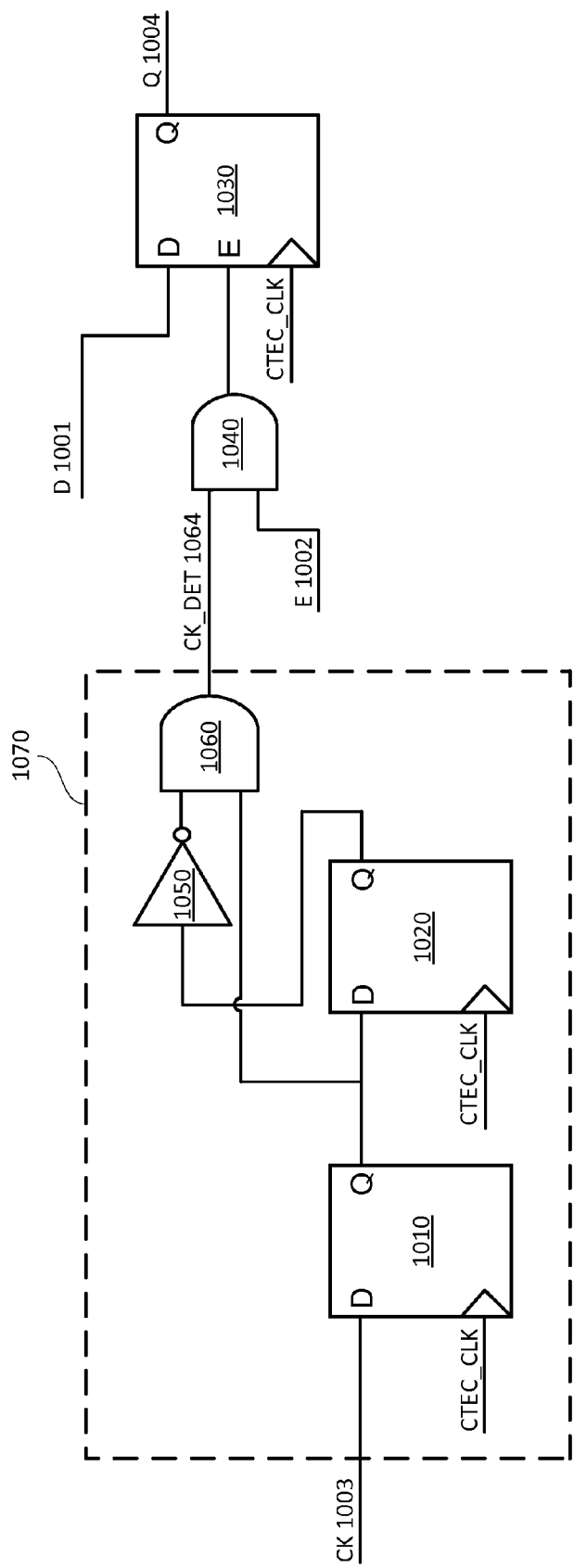
FIG. 10 is an illustration of another transformed edge-sensitive state element having an enable.

According to another embodiment, the netlist can be transformed. To perform the transformation, a complete design database may be used, and derived clocks in the database may use a circuit as illustrated in FIG. 10. For the various clock islands, one circuit 1070 may generate clock enable pulses to be distributed to various state elements. A single global clock CTEC_CLK can be used to clock the state elements for the transformed state elements.

Circuit 1070 includes two state elements 1010 and 1020, an inverter 1050, and a two-input AND gate 1060. State elements 1010 and 1020 can be clocked by the global clock CTEC_CLK. State elements 1010 receive the user clock CK 1003 at its data input D. The output Q of state element 1010 feeds the data input D of state element 1020 as an input of AND gate 1060. The other input of AND gate 1060 receives the inverted output Q of state element 1020. AND gate 1060 provides the output of circuit 1070, CK_DET 1064. In this configuration, Circuit 1070 functions like an edge detector, producing a pulse CK_DET 1064 having a width of CTEC_CLK for a rising edge of user clock CK 1003.

The output CK_DET 1064 of circuit 1070 is received by one input of a two-input AND gate 1040, which receives an enable signal E 1002 at its other input. The ANDed output is received by state element 1030 at its enable input E. The state element 1030 receives a data input signal D 1001 at its data input D, the global clock CTEC_CLK, and outputs Q 1004 at its data output. Output CK_DET 1064 is also received by other state elements of the clock island, these state elements also using an AND gate at their input where they would otherwise receive an enable signal.

Figure 11:
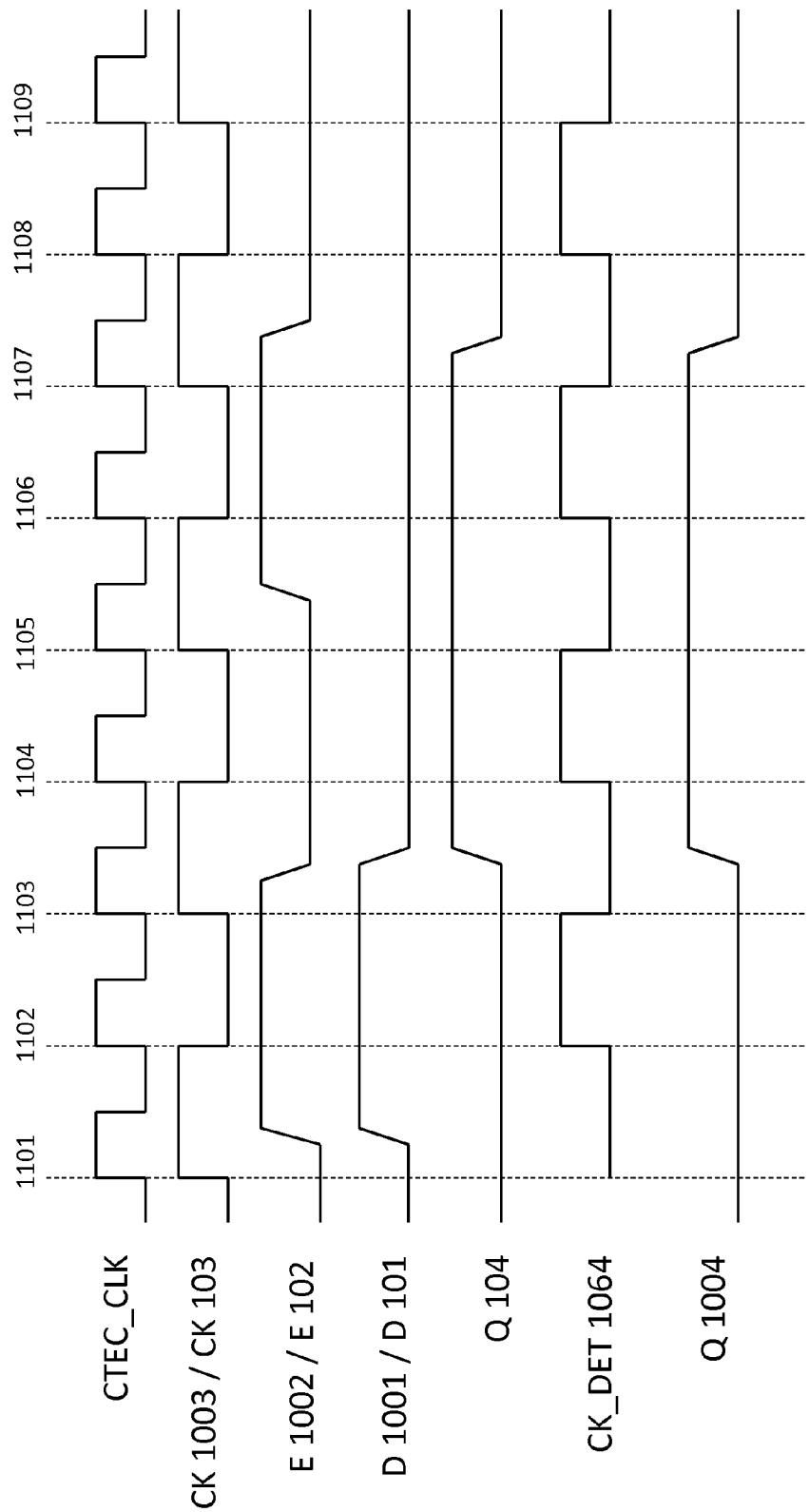
FIG. 11 illustrates a timing diagram for another transformed edge-sensitive state element having an enable and an edge-sensitive state element having an enable.

FIG. 11 is a timing diagram showing various nodes of the edge-sensitive state element 100 of FIG. 1 and various nodes of the transformed netlist illustrated in FIG. 10, according to an embodiment. Here, the global clock CTEC_CLK may be selected to be at least twice as fast as user clock CK 1003. Prior to time 1102, data input signal D 1001 and enable signal E 1002 both transition to high. After time 1102, both enable signal E 1002 and output CK_DET 1064 are high, and thus state element 1030 is enabled. On the next rising edge of CTEC_CLK at 1103, the high output of D 1001 is passed to the output of state element 1030, driving Q 1004 high after time 1103. Comparing the timing of the output Q 1004 of state element 1030 in FIG. 10 to the output Q 104 of state element 100 of FIG. 1, the outputs may transition on the same user clock cycle.

The netlist transformation may be more involved than the library transformation because there may be a greater impact on the netlist of the chip design. For example, the enable net, E 102 in FIG. 1, is split during netlist transformation. However, a benefit of the netlist transformation is that it may require less overhead than the previously-described library transformation. Additional AND gates 1040 may be used for various state elements of a clock island where an enable would otherwise be used by the pre-transformation state element, but a single circuit 1070 can be used for the entire clock island. Thus, a greater number of FPGA resources may be used than without any transformation to utilize the CTEC_CLK, but fewer such resources may be used according to a netlist transformation approach.

Certain FPGAs feature primitives that allow the use of a few numbers of elements to be clocked by the CTEC_CLK global clock. According to an embodiment, an FPGA having such a primitive, for example a DFFEAS primitive provided in a Quartus II FPGA available from Altera Corporation, can be used to transform an edge-triggered state element, with enable, that can be clocked by a global clock CTEC_CLK with locally-generated user clocks. Such an FPGA can typically have many such primitives. The FPGA primitive can be a state element that features additional pins and can have available additional functionality beyond that of a simple edge-triggered state element with enable such as that of state element 100 of FIG. 1. The truth-table for an exemplary DFFEAS primitive used in a Quartus II FPGA is as follows (where Qo is the level of Q before clock pulse):

TABLE 1

| Inputs | | | | | | | | | Output |
|---|---|---|---|---|---|---|---|---|---|
| CLRN | PRN | ALOAD | ASDATA | SCLR | SLOAD | ENA | D | CLK | Q |
| L | H | L | X | X | X | X | X | X | L |
| H | L | L | X | X | X | X | X | X | H |
| L | L | L | X | X | X | X | X | X | L |
| H | H | L | X | X | X | L | X | X | Qo* |
| H | H | L | X | H | X | H | X | ↑ | L |
| H | H | L | L | L | H | H | X | ↑ | L |
| H | H | L | H | L | H | H | X | ↑ | H |
| H | H | L | X | L | L | H | L | ↑ | L |
| H | H | L | X | L | L | H | H | ↑ | H |
| H | H | L | X | X | X | X | L | Qo |
| H | H | H | H | X | X | X | X | X | H |
| H | H | H | L | X | X | X | X | X | L |
| L | H | H | X | X | X | X | X | X | L |
| H | L | L | X | X | X | X | X | X | H |

Figure 12:
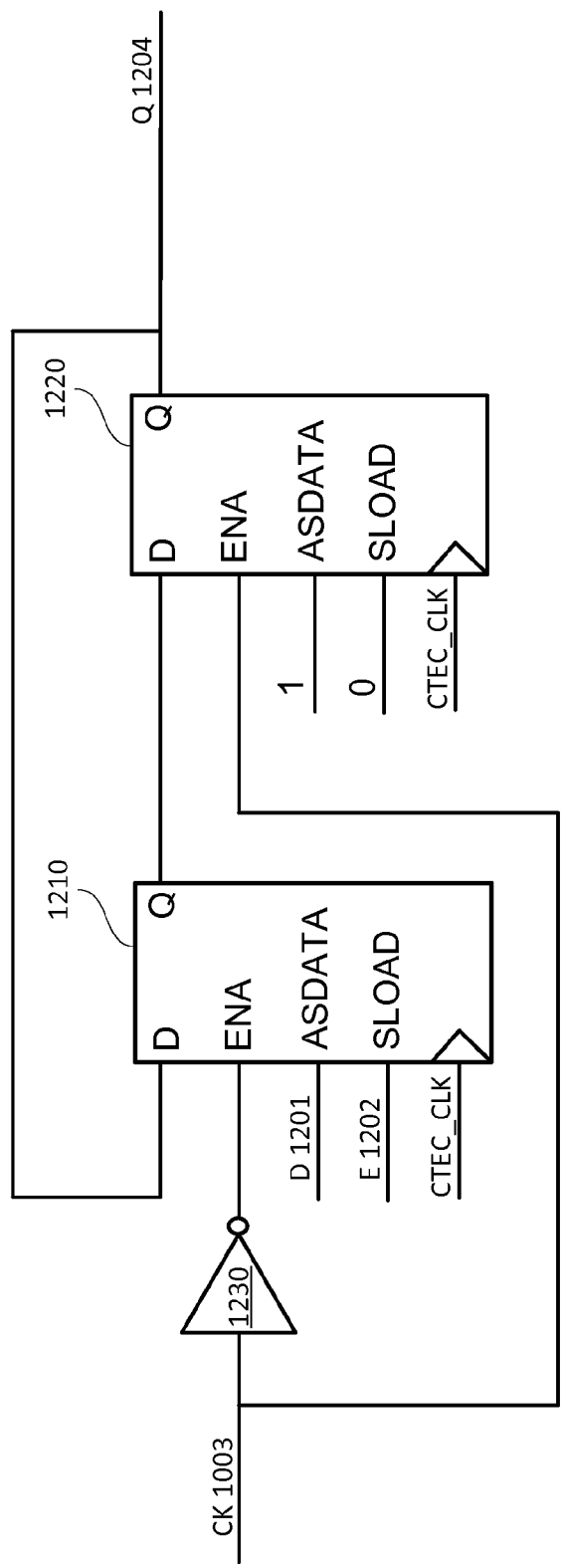
FIG. 12 is an illustration of a transformed edge-sensitive state element having an enable using certain FPGA primitives.

FIG. 12 illustrates a FPGA primitive transformed according to an embodiment to receive a global clock CTEC_CLK and a user clock CK 1003. Only some of the inputs of the primitive are illustrated. A minimum of two FPGA primitives 1210 and 1220, and an inverter may be needed. Primitives 1210 and 1220 are clocked with the global clock CTEC_CLK that may be at least twice as fast as the user clock CK 1003. The data signal D 1201 is received at the asynchronous/synchronous data input ASDATA of primitive 1210; enable signal E 1202 is received at the synchronous load input SLOAD; and user clock signal CK 1003, inverted by inverter 1230, is received at the clock enable input ENA. The output Q of primitive 1210 feeds the data input D of primitive 1220. Primitive 1220 receives the user clock CK 1003 at its clock enable input ENA, while ASDATA is set high and SLOAD is set low. The output Q of primitive 1220 transmits output Q 1204 and is connected with a feedback to the data input D of primitive 1210.

In the configuration shown in FIG. 12, the FPGA primitives clocked with the global clock CTEC_CLK having a frequency at least twice that of user clock CK 103 can perform functionality equivalent to the edge-sensitive state element having an enable clocked with the user clock CK 103 as illustrated in FIG. 1. According to this embodiment, the number of state elements is increased, but the advantages of generating clocks locally and providing a global clock CTEC_LK are maintained, such advantages including a reduction of hold time error problems and freeing up global clock routing resources.

Figure 13:
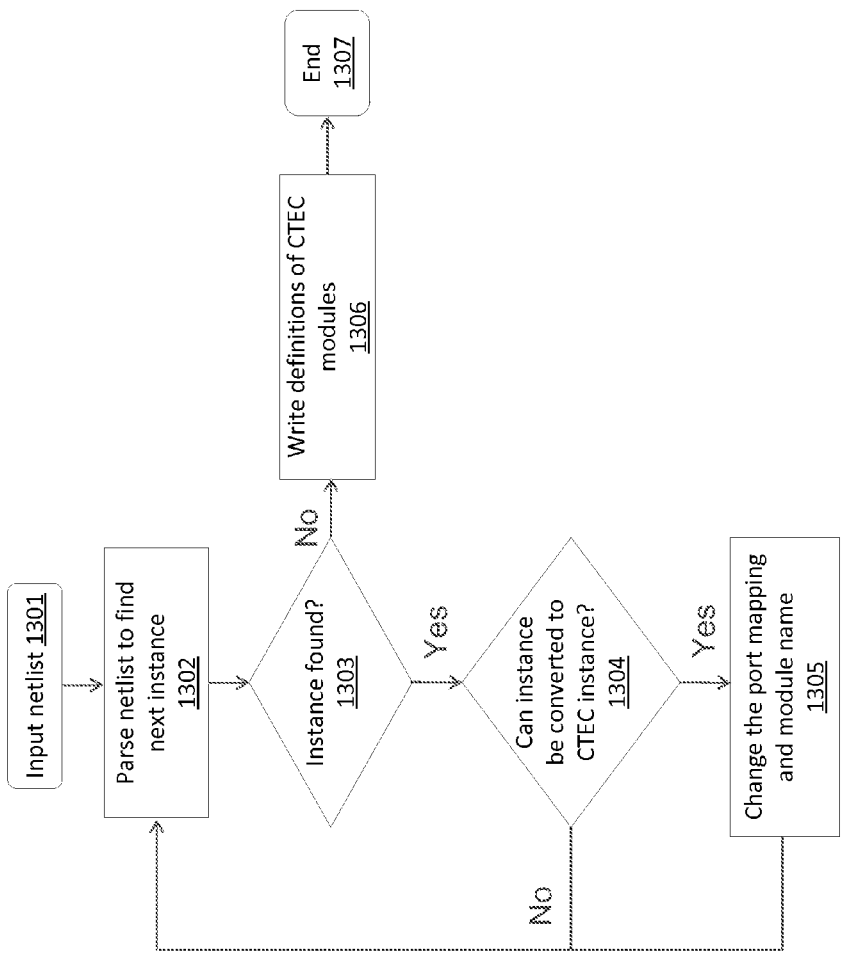
FIG. 13 illustrates a flow for netlist conversion according to an embodiment
Figure 14:
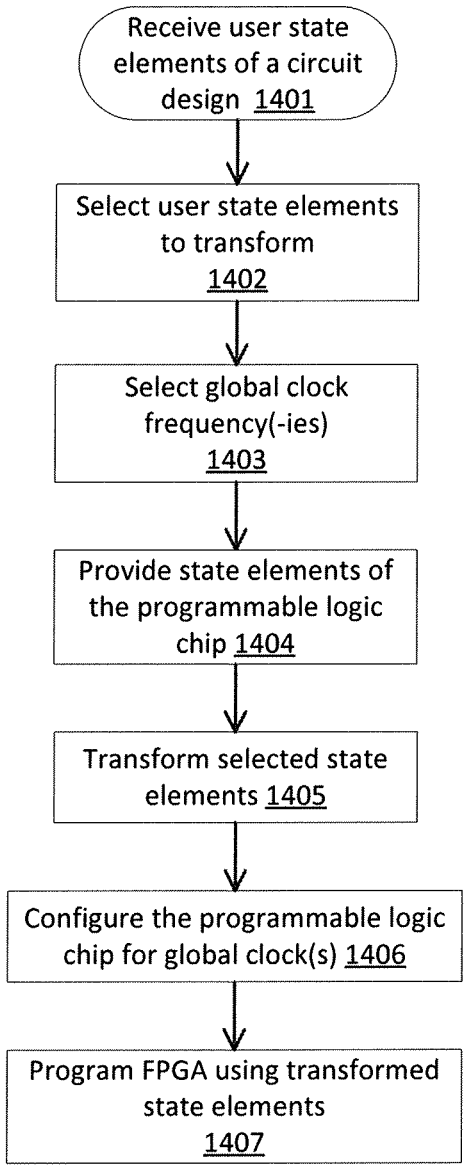
FIG. 14 illustrates a flow for transforming a plurality of state elements of a circuit design to be verified in a hardware functional verification system.

FIG. 13 illustrates an exemplary flow to perform a netlist transformation of a user's chip design according to an embodiment. This flow may be performed by software for such a purpose on a workstation, which may be general purpose computer, for example the same workstation running an FPGA compiler software for a platform for prototyping the user's chip design.

First a user provides a netlist of the user design to be prototyped in an FPGA prototyping system at step 1301. The netlist is parsed at step 1302 to find the next instance of a state element to be transformed, for example the first instance. Such instances of state element include edge-trigger state element, both with and without enable pins, and level-sensitive state elements. If an instance of the state element is found that has not already been transformed at decision point 1303, the flow proceeds to decision point 1304. However, if the flow does not find an instance that has not already been converted, for example because there are no further instances to transform or there are no instances at all to transform, the flow proceeds to write definitions for the CTEC modules at step 1306. Once the definitions have been written, the process ends at 1307. If not all instances were found at step 1303, then the software running on the workstation will next analyze whether it is possible to convert the instance to a state element that receives a CTEC_CLK clock at decision point 1304. If it is possible, then the flow proceeds to step 1305, but if it is not possible, then the flow returns to step 1302 and parses the netlist to find the next instance 1303. If it is possible to convert to a CTEC instance, then at step 1305 the port mapping is changed where applicable to take into account the configuration of the transformed state element. The module name is also modified to reflect the transformation, after which the flow returns to step 1302 to parse the netlist of the user.

For both the library transformation and the netlist transformation, because a single state element may be replaced by up to three state elements, the number of state elements required in an FPGA during prototyping required to for a chip design necessarily increases. However, FPGAs typically have a large number of state elements available relative to the number of gates available. Because of this, depending on the numbers of the different state elements present in a chip design, the amount of FPGA resources used may not differ significantly even if the state elements are all converted to be compatible with a single global clock.

According to another embodiment, instead of a single global clock, multiple global clocks can be used. Depending on the chip design to be prototyped, there may be advantageous to using multiple global clocks rather than a single global clock. For example, it may be easier to derive some of the user clocks from a first global clock having a first frequency and to derive other user clocks from a second global clock having a different frequency. As long as the number of global clocks used to derive user clocks is no more than the number of global clock routing resources available in the FPGA, multiple global clocks can be utilized. Using multiple clocks may be computationally easier, resulting in a shorter FPGA configuration time, if certain user clocks are derived from a particular global clock frequency. It may then be computationally easier if other user clocks are derived for another global clock frequency. It can also be the case that deriving different user clocks from different ones of the multiple global clocks saves FPGA resources by simplifying the circuitry needed on the FPGA to perform on-FPGA clock generation.

Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

We claim:

1. A computer-implemented method of transforming a plurality of state elements of a circuit design to be programmed into a hardware functional verification system, comprising:

receiving in a memory of the computer a circuit design having a plurality of user state elements configured to operate using a plurality of user clocks, each user clock having a user clock frequency;

selecting a set of user state elements from the plurality of user state elements, one or more of the user state elements of the set of user state elements having a highest user clock frequency;

selecting a global clock frequency for a global clock to be distributed within the functional verification system, wherein the global clock frequency is at least twice the highest user clock frequency; and transforming each user state element of the set of user state elements into a transformed user state element comprising one or more state elements, each state element configured to receive the global clock, each transformed user state element configured to receive the same inputs as its corresponding user state element, and each transformed user state element to perform the function of the corresponding user state element at the user clock frequency when the transformed user state element is programmed into the functional verification system.

2. The method of claim 1, further comprising:

selecting a second set of user state elements from the plurality of user state elements, one or more of the user state elements of the set of user state elements having a second highest user clock frequency;

selecting a second global clock frequency for a second global clock to be distributed within the functional verification system, wherein the second global clock frequency is at least twice the second highest user clock frequency; and transforming each user state element of the second set of user state elements into a second transformed user state element comprising one or more state elements, each state element configured to receive the second global clock, each second transformed user state element configured to receive the same inputs as its corresponding user state element, and each second transformed user state element to perform the function of the corresponding user state element at the user clock frequency when the second transformed user state element is programmed into the functional verification system.

3. The method of claim 1, wherein each user state element comprises one of an edge-sensitive state element having an enable port, an edge-sensitive state element lacking an enable port, and a level-sensitive state element.

4. The method of claim 1, wherein the circuit design is a system-on-chip design having a plurality of clock islands.

5. The method of claim 1, further comprising:

programming one or more programmable logic chips with the circuit design having the transformed user state elements; and configuring each programmable logic chip of the one or more programmable logic chips to receive the global clock.

6. The method of claim 5, wherein each programmable logic chip of the one or more programmable logic chips is a field-programmable gate array (FPGA).

7. The method of claim 6, wherein each FPGA resides in an FPGA-based prototyping system.

8. A computer-implemented method of transforming a circuit design netlist for programmable logic chip configuration comprising:

receiving a netlist for a circuit design in a memory of the computer, wherein the circuit design comprises a plurality of instances of state elements to be programmed into a programmable logic chip, each state element configured to receive a user clock having a user clock frequency;

determining a highest user clock frequency;

inputting the netlist into a programmable logic chip configuration program;

parsing the netlist to find a plurality of state elements;

analyzing each state element of the plurality of state elements to determine a plurality of convertible state elements comprising a subset of the plurality of state elements, wherein each convertible state element has a plurality of ports configured to receive a plurality of inputs including a user clock;

providing a plurality of circuit instances for the programmable logic chip, each circuit instance representing functionality equivalent to at least one of the convertible state elements, wherein each circuit instance is configured to receive, when distributed within the programmable logic chip, a fast global clock having a frequency at least twice the highest user clock frequency, and each circuit instance having a plurality of ports corresponding to the ports of the convertible state element; and changing a port mapping for the ports of each convertible state element to align with the ports of a circuit instance equivalent to the convertible state element.

9. The method of claim 8, wherein each circuit instance of the plurality of circuit instances comprises one of an edge-sensitive state element having an enable port, an edge-sensitive state element lacking an enable port, and a level-sensitive state element.

10. The method of claim 8, wherein a circuit instance of the plurality of circuit instances comprises:

an inverter configured to receive the user clock;

a first programmable logic chip primitive having an input port and an output port, configured to receive an inverted user clock from the inverter at an enable port, and configured to be clocked by the fast global clock;

a second programmable logic chip primitive having an input port electrically connected to the output port of the first programmable logic chip primitive, having an output port electrically connected to the input port of the first programmable logic chip primitive, configured to receive the user clock, and configured to be clocked by the fast global clock.

11. The method of claim 8, wherein a circuit instance of the plurality of circuit instances comprises two programmable logic chip primitives, each programmable logic chip primitive receiving the fast global clock.

12. The method of claim 8, wherein the circuit design is a system-on-chip design having a plurality of clock islands.

13. The method of claim 8, wherein the first programmable logic chip primitive and the second programmable logic chip primitive comprise primitives of an FPGA.

14. The method of claim 13, wherein each FPGA resides in an FPGA-based prototyping system.

15. A computer-readable non-transitory storage medium having stored thereon a plurality of instructions, the plurality of instructions when executed by a computer, cause the computer to perform:

receiving a circuit design having a plurality of user state elements configured to operate using a plurality of user clocks, each user clock having a user clock frequency;

selecting a set of user state elements from the plurality of user state elements, one or more of the user state elements of the set of user state elements having a highest user clock frequency;

selecting a global clock frequency at least twice the highest user clock frequency; and transforming each user state element of the set of user state elements into a transformed user state element comprising one or more state elements, each state element configured to receive a global clock having the global clock frequency, each transformed user state element configured to receive the same inputs as its corresponding user state element, and each transformed user state element performing the function of the user state element at the user clock frequency.

16. The computer-readable non-transitory storage medium of claim 15, the plurality of instructions when executed by a computer, cause the computer to further perform:

selecting a second set of user state elements from the plurality of user state elements, one or more of the user state elements of the set of user state elements having a second highest user clock frequency;

selecting a second set of user state elements from the plurality of user state elements, one or more of the user state elements of the set of user state elements having a second highest user clock frequency;

selecting a second global clock frequency at least twice the second highest user clock frequency; and transforming each user state element of the second set of user state elements into a transformed user state element comprising one or more state elements, each state element configured to receive a second global clock having the second global clock frequency, each transformed user state element configured to receive the same inputs as its corresponding user state element; and each transformed user state element performing the function of the user state element at the user clock frequency.

17. The computer-readable non-transitory storage medium of claim 15, wherein each user state element comprises one of an edge-sensitive state element having an enable port, an edge-sensitive state element lacking an enable port, and a level-sensitive state element.

18. The computer-readable non-transitory storage medium of claim 15, wherein the circuit design is a system-on-chip design having a plurality of clock islands configured to receive a plurality of clocks, at least some of the clocks having different clock frequencies.

19. The computer-readable non-transitory storage medium of claim 15, the plurality of instructions when executed by a computer, cause the computer to further perform:

programming one or more programmable logic chips with the circuit design having the transformed user state elements; and configuring each programmable logic chip of the one or more programmable logic chips to receive the global clock.

20. The computer-readable non-transitory storage medium of claim 19, wherein each programmable logic chip of the one or more programmable logic chips is a field-programmable gate array (FPGA).

21. The computer-readable non-transitory storage medium of claim 20, wherein each FPGA resides in an FPGA-based prototyping system.

22. A computer-readable non-transitory storage medium having stored thereon a plurality of instructions, the plurality of instructions when executed by a computer, cause the computer to perform:

receiving a netlist for a circuit design, wherein the circuit design comprises a plurality of instances of state elements, each state element configured to receive a user clock having a user clock frequency;

determining a highest user clock frequency;
inputting the netlist into an FPGA configuration program;
parsing the netlist to find a plurality of state elements;
analyzing each state element of the plurality of state elements to determine a plurality of convertible state elements comprising a subset of the plurality of state elements, wherein each convertible state element has a plurality of ports configured to receive a plurality of inputs including a user clock;
providing a plurality of circuit instances, each circuit instance representing functionality equivalent to at least one of the convertible state elements, wherein each circuit instance is configured to receive a fast global clock having a frequency at least twice the highest user clock frequency, and each circuit instance having a plurality of ports corresponding to the ports of the convertible state element; and
changing a port mapping for the ports of each convertible state element to align with the ports of a circuit instance equivalent to the convertible state element.

23. The computer-readable non-transitory storage medium of claim 22, wherein each circuit instance of the plurality of circuit instances comprises one of an edge-sensitive state element having an enable port, an edge-sensitive state element lacking an enable port, and a level-sensitive state element.

24. The computer-readable non-transitory storage medium of claim 22, wherein a circuit instance of the plurality of circuit instances comprises:
an inverter configured to receive the user clock;
a first FPGA primitive having an input port and an output port, configured to receive an inverted user clock from the inverter at an enable port, and configured to be clocked by the fast global clock;
a second FPGA primitive having an input port electrically connected to the output port of the first FPGA primitive, having an output port electrically connected to the input port of the first FPGA primitive, configured to receive the user clock, and configured to be clocked by the fast global clock.

25. The computer-readable non-transitory storage medium of claim 22, wherein a circuit instance of the plurality of circuit instances comprises two FPGA primitives, each FPGA primitive receiving the fast global clock.

26. The computer-readable non-transitory storage medium of claim 22, wherein the circuit design is a system-on-chip design having a plurality of clock islands configured to receive a plurality of user clocks, at least some of the user clocks having different clock frequencies.

27. The computer-readable non-transitory storage medium of claim 22, wherein the first programmable logic chip primitive and the second programmable logic chip primitive comprise primitives of an FPGA.

28. The computer-readable non-transitory storage medium of claim 27, wherein each FPGA resides in an FPGA-based prototyping system.

* * * * *